No. 738,570. PATENTED SEPT. 8, 1903.
C. L. PRUYN.
CHILD'S BLOCK.
APPLICATION FILED FEB. 26, 1902.
NO MODEL.
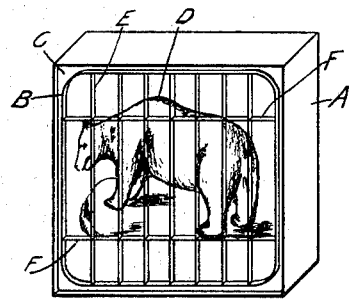
Witnesses
Jessie Guardenier
Lottie Prior.
by
Inventor
Charles L. Pruyn
Ward Cameron.
Attys No. 738,570. Patented September 8, 1903.

UNITED STATES PATENT OFFICE.

CHARLES L. PRUYN, OF ALBANY, NEW YORK.

CHILD'S BLOCK.

SPECIFICATION forming part of Letters Patent No. 738,570, dated September 8, 1903.

Application filed February 26, 1902. Serial No. 95,717. (No model.)

*To all whom it may concern:*

Be it known that I, CHARLES L. PRUYN, a citizen of the United States of America, and a resident of the city and county of Albany, State of New York, have invented certain new and useful Improvements in Children's Blocks, of which the following is a specification.

My invention relates to improvements in children's blocks; and the object of my invention is to provide a block upon which a picture is placed, and upon the surface containing the picture are raised lines or bars, producing the effect of a cage within which the animal portrayed by the picture is confined. I attain this object in the manner shown in the accompanying drawing, in which the figure is a perspective view.

The block A has upon the face C a raised portion or rib B, extending around the face within the edge of the block. Extending vertically across the face C are a series of parallel raised ribs or bars E, meeting at each end the raised portion B, and extending across the face C at right angles to the ribs or bars E are the raised ridges or bars F, also meeting at each end the said portion B. The plane surface C of the block and the raised ribs or bars bear portion of a pictured animal D. The picture appears in the spaces between the ribs or bars, those portions on the bars being very small and scarcely noticeable, so that the effect is given of an animal seen between the bars of a cage.

I show on the block a picture of a bear; but of course do not limit myself to the representation of a bear, since it is my intention of placing various animals on the blocks as a means of educating as well as entertaining children.

What I claim as my invention, and desire to secure by Letters Patent, is—

A child's block having a plane face with permanent rigid narrow raised ribs or bars integral with said face and portions of a pictured animal upon the face of the block and bars whereby the picture is mostly seen in the spaces between the bars and the animal will appear as in a cage.

Signed at Albany, New York, this 21st day of February, 1902.

CHARLES L. PRUYN.

Witnesses:
 FREDERICK W. CAMERON,
 LOTTIE PRIOR.